July 31, 1951 R. B. DE LANO, JR 2,562,449
APPARATUS FOR INSPECTING MATERIALS BY WAVE TRAINS
Filed Jan. 17, 1946 2 Sheets-Sheet 1

INVENTOR.
RALPH B. DE LANO JR.
BY Joseph H. Lipschutz
ATTORNEY

Patented July 31, 1951

2,562,449

UNITED STATES PATENT OFFICE 2,562,449

APPARATUS FOR INSPECTING MATERIALS BY WAVE TRAINS

Ralph B. De Lano, Jr., New York, N. Y., assignor to Sperry Products, Inc., Hoboken, N. J., a corporation of New York Application January 17, 1946, Serial No. 641,706

7 Claims. (Cl. 73—67)

1

This invention relates to a means for testing materials by means of wave trains of radio, supersonic or other high frequency signals. One such means for testing is disclosed in the patent to F. A. Firestone No. 2,280,226, granted April 21, 1942 which discloses the method of sending wave trains into an article under test and measuring the time interval which elapses between the sending of the signal and receiving of the reflection from defects within the article. The transmitted pulse may be applied to the article by a piezoelectric crystal and the reflected pulse may be received either by the same crystal or another crystal, and the output of the crystal may be impressed on the input of a receiver amplifier. Heretofore, as disclosed in the said Firestone patent, the output of the amplifier was impressed on the electrode of a cathode ray oscilloscope to vary a sweep and thus give a visual electronic indication of the various outputs from the receiver amplifier. In my co-pending application Ser. No. 636,030 filed December 19, 1945, now Patent No. 2,507,854, I have disclosed means for cutting out the indications due to the generation of the pulse and its reflection from the rear surface of the article so that only the reflections due to defects within the article will be indicated. In said application I accomplish the result by rendering the receiver amplifier ineffective during predetermined intervals. It is one of the objects of this invention to accomplish the same result without rendering the receiver ineffective.

It is another object of this invention to provide, in a system as described above, an indicator, such as a meter, having a mechanically movable member, instead of a cathode ray oscilloscope, said meter having means for indicating not only the presence of a defect but the distance of the defect below the entering surface of the article through which the wave trains are transmitted.

It is a further object of this invention to provide an indicator of the type described above wherein the distance of the defect below the entering surface, which is a function of time of travel of the pulse, is converted into voltage which is a linear function of distance, and utilizing the voltage to actuate an indicator.

Further objects and advantages of this invention will become apparent in the following detailed description thereof:

In the accompanying drawings,

Figs. 2A and 2B are diagrammatic illustrations of an article under test showing defects at different distances beneath the surface and indicating the different periods of time necessary for a wave train to travel from the defect back to the entering surface.

Figs. 3A and 3B are diagrammatic representations of dials which may be employed in connection with the meter which indicates the distances below the surface of the various defects indicated in Figs. 2A and 2B.

Figure 1:
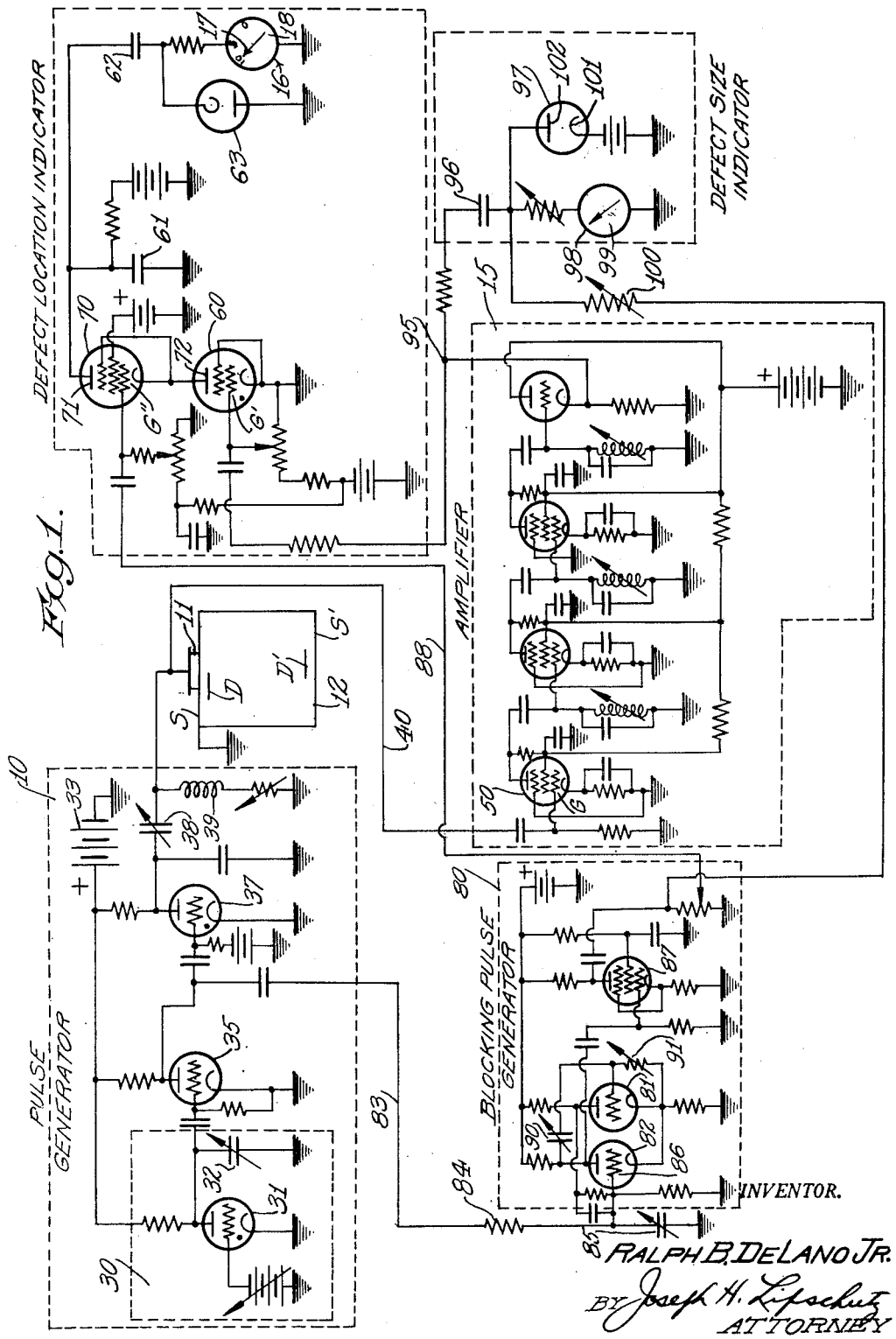
Fig. 1 is a wiring diagram illustrating one embodiment of my invention.

Reference to Fig. 1 discloses my invention applied to a supersonic testing device wherein wave trains or pulses are periodically generated by a suitable pulse generator 10. Each pulse or wave train as it is generated is impressed upon a crystal 11 which is in engagement with a work piece 12 which it is desired to test for defects. The pulse will cause the crystal 11 to oscillate and send a train of mechanical vibrations through the work piece 12 from the front or entering surface S through the block to the opposite or rear surface S'. At the same time that the pulse is impressed on the crystal 11, it is also impressed on an amplifier 15 whose output may actuate an indicator 16 which, in the present invention, is a meter having a mechanically movable element such as pointer 17 operating over a suitable dial 18.

As shown in Fig. 1 the pulse generator may comprise a synchronizer 30 which may take the form of a gas discharge tube 31, which is periodically discharged by reason of the fact that a condenser 32 is periodically charged from a source of positive voltage 33. As the condenser accumulates a positive charge to a predetermined degree, sufficient positive voltage will be placed on the plate of the gas tube 31 to cause the tube to discharge. Thus will generate a negative voltage which is passed through a phase inverter tube 35 whose output will, therefore, be a positive voltage which will be placed upon the grid of a gas discharge tube 37 to generate a pulse. Thus, each time the condenser 32 discharges, tube 37 will discharge to generate a pulse having an exponential decay characteristic. Momentary frequency is determined by the condenser 38 and coil 39. This pulse is applied to crystal 11 to generate the wave train which passes into the work piece 12.

It is apparent that the wave train which is applied to the crystal 11 will by connection 40 be applied also to the input grid G of tube 50 of the receiver amplifier 15. Similarly, the reflection of the wave train from the rear surface S' would, on striking the crystal 11, generate a pulse which would also be applied to the amplifier 15. In addition, the reflections of the wave train from defects such as D and D' within the article would also be received by the crystal 11 and impressed on the amplifier. The output from amplifier 15 is caused to actuate the indicator 16 by causing a voltage to be impressed on the grid G' of a gas discharge tube 60 which, upon firing, causes a condenser 61 to discharge. The discharge of condenser 61 places the proper polarity across the circuit of indicator 16 to render a diode tube 63 conductive so that current passes through the circuit including the tube 63 and indicator 16.

Unless means were provided for inhibiting the discharge of tube 60 during the generation of the wave train and during the reception of the reflection of the wave train from the rear surface S' of the article, it is apparent that the indicator 16 would be actuated throughout these periods and it would be difficult or impossible to differentiate the indications due to reflections of a defect from those indications due to the generation of the pulse and its reflection from the opposite surface of the article. Therefore, I provide means which will (1) block the indicator during the generation of the pulse, (2) block the indicator before the reflection of the generated pulse from surface S' is received by the crystal, and (3) maintain the indicator blocked from a time just before the reflection of the wave train from S' is received until the end of the succeeding generated pulse. Therefore, the indicator will be effective to be operated by the output from amplifier 15 during the interval between the end of the generated wave train and a time just before the reflection of this pulse from surface S' is received.

To accomplish the hereinbefore described functions, I provide means for preventing firing of the gas tube 60 during the above described blocking intervals. This means may comprise, in the circuit from condenser 61 to the plate of gas tube 60, a pentode tube 70 whose plate 71 is connected to condenser 61 and which has a control grid G'' on which a blocking voltage is placed during the above described blocking intervals so that, even though there is an output from the amplifier 15 in response to the generated wave train and to its reflection from surface S', the tube 60 will nevertheless not fire because tube 70 which controls the voltage on plate 72 is not conductive during these intervals.

In order to place the blocking voltage on grid G'' while the pulse is being generated and while the reflection from S' is being received, there is provided a blocking pulse generator 80 which is in the form of a multivibrator having one tube 81 normally conductive and the other tube 82 normally biased to cutoff. The generation of the wave train or pulse sends a voltage through connection 83 by way of time constant means, comprising resistor 84 and condenser 85, to the grid 86 of tube 82 which will render the tube 82 conductive and thus cause a pulse to be generated which, after being amplified by tube 87, is impressed through connection 88 on the control grid G'' to render the tube 70 conductive to place the proper plate voltage on plate 72 so that, when the output of amplifier 15 places a positive signal on grid G', tube 60 can fire to permit condenser 61 to discharge and thus operate the indicator 16.

In order that the tube 70 shall not be rendered conductive until the generation of the wave train has been completed, the time constant elements 84, 85 are so chosen that the necessary bias is not placed on grid 86 until the generation of the pulse has ended and, therefore, there is no output from the blocking pulse generator until such pulse generation has terminated.

Once the pulse from the blocking pulse generator 80 is placed upon grid G'', tube 70 is rendered conductive to place the necessary voltage on the plate of tube 60, as described, and any reflections of the wave train from defects such as D or D' will cause amplifier 15 to place a positive voltage on grid G' to cause tube 60 to fire. As soon as tube 60 fires, condenser 61 begins to discharge and, since tube 70 is a pentode tube, this discharge will be linear with respect to time, and, therefore, distance, because the plate current of such a tube is linear. In other words, the voltage discharge of condenser 61 is a direct function of time. The discharge of condenser 61 will continue until tube 70 is rendered non-conductive. This cut-off point is always the same and is chosen so that it will occur just before the reflection of the generated pulse from surface S' is received by crystal 11. For this purpose, the blocking pulse generator circuit is provided with time constant means in the form of a condenser 90 and resistor 91 so that tube 82 will remain conductive for a time interval beginning when the generation of the wave train ends and continuing until just prior to the reception of the reflection of the wave train from surface S' by crystal 11.

Thus, it will be seen that tube 70 is conductive for the above described interval beginning when the generation of the pulse ends and ending just prior to the reception by crystal 11 of the reflection of the pulse from surface S'. During this interval any output from amplifier 15 must be due only to the reflection received by crystal 11 from a defect such as D or D'. Such output of amplifier 15 will cause tube 60 to fire and condenser 61 to begin to discharge. The point in the travel of the pulse from surface S to surface S' and back to surface S, at which the tube 60 fires and condenser 61 begins to discharge, is a function of the distance of the defect below the surface S. Thus, the defect D lying close to surface S will begin to reflect the pulse very soon after the pulse enters the block 12 and hence tube 60 will fire and condenser 61 will discharge from the time the pulse reflected from D begins to be received and continuing until the pulse has travelled to S' and back to S. This is a relatively long period. In contrast, a defect such as D' lying close to the rear surface S' will fire tube 60 and begin to discharge condenser 61 only after the pulse has travelled the distance from S to D' and back to S. Therefore, the condenser 61 will discharge for a relatively shorter period of time when reflected from a pulse such as D' than when reflected from a pulse such as D. Since the discharge of condenser 61 is always cut off at the same time, i. e., just before the reflection of the pulse from S' reaches crystal 11, the time during which condenser 61 discharges is a function of the distance of the defect below the surface S. Stated differently, the longer the condenser 61 discharges, the closer to surface S is the defect. This is shown graphically in Figs. 2A and 2B and in Figs. 3A and 3B. Thus the solid lines in Figs. 2A and 2B indicate the portion of the travel of the pulse through the article during which the condenser discharges, said time being inversely proportional to the distance of the defect below the entering surface. The longer the condenser 61 discharges, the greater will be the change of potential across the tube 63 to give a greater indication on meter 16. The further the pointer 17 moves, the closer to the entering surface S is the defect. Therefore, the dial is calibrated with diminishing figures representing distances so that the further the pointer 17 moves the smaller is the figure indicated since this figure represents distance beneath the surface S.

By the above described arrangement, the indicator 16 will give an indication not only of the presence of a defect but also of the distance of the defect beneath the entering surface of the article. It is also possible at the same time to obtain an indication of the magnitude of the defect since such magnitude is proportional to the amount of wave train reflection received at the crystal 11 from the respective defect. Therefore, there may be taken off the output from the amplifier 15 at, for instance, point 95, a pulse which may be impressed on a circuit similar to that in which indicator 16 is contained and comprising a condenser 96, a diode 97 and an indicator 98. The circuit of indicator 98 will, therefore, become conductive if there is an output from the amplifier and the degree of movement of the pointer 99 will indicate the magnitude of the defect. In order that indicator 98 shall function only when indicator 16 is rendered effective, a blocking pulse voltage from the generator 80 is applied to the diode 97 at the same time that a blocking pulse voltage is applied to tube 70. The cathode 101 is normally biased positive with respect to anode 102 but the blocking pulse voltage counteracts this bias. No appreciable current flows from the blocking pulse generator at this time because of impedance 100. However, output from the amplifier while the bias is counteracted will cause positive cycles of current to flow through diode 97 while negative cycles flow through meter 98 of a magnitude proportional to the output of the amplifier which is proportional to the size of the defect.

Since the pulses are generated periodically at short intervals, a series of indications will be received by indicators 16 and 98 at each position of the crystal 11 so that the indications will be repeated and the indicators will in effect give an indication proportional to the peak voltage that is impressed across their input terminals.

The foregoing description of the invention is merely illustrative and changes may be made within the scope of the appended claims.

Having described my invention, what I claim and desire to secure by Letters Patent is:

1. In a device for testing material, means for generating a pulse, means for transmitting the pulse into the material through an entering surface thereof and for receiving reflections, a receiver actuated by said transmitting and receiving means, indicating means including a gas discharge tube having a plate and a grid, a circuit for said plate, means for maintaining said plate circuit ineffective until the generation of the pulse ends, and means for again rendering said plate circuit ineffective prior to the reception of the reflected pulse from the opposite surface of the material, the grid being connected to the output of the receiver whereby the gas tube will fire in response to a signal from the receiver when the plate circuit is effective.

2. In a device for testing material, means for generating a pulse, means for transmitting the pulse into the material through an entering surface thereof and for receiving reflections, a receiver actuated by said transmitting and receiving means, indicating means including a gas discharge tube having a plate and a grid, a circuit for said plate including a second tube having a control grid, means for placing a blocking voltage on the control grid for rendering said plate circuit and the gaseous discharge tube ineffective until the generation of the pulse ends and again placing a blocking voltage on the control grid prior to the reception of the reflected pulse from the opposite surface of the material, the grid being connected to the output of the receiver whereby the gas tube will fire in response to a signal from the receiver resulting from a reflection of the pulse from a defect within the material when said plate circuit is effective.

3. In a device for testing material, means for generating a pulse, means for transmitting the pulse into the material through an entering surface thereof and for receiving reflections, a receiver actuated by said transmitting and receiving means, indicating means including a gas discharge tube having a plate, a circuit for said plate including a second tube having a plate with linear plate current characteristic and having a control grid, means for placing a blocking voltage on the control grid for rendering the plate circuit of the gaseous discharge tube ineffective until the generation of the pulse ends and again placing a blocking voltage on the control grid prior to the reception of the reflected pulse from the opposite surface of the material, the grid of the gas tube being connected to the output of the receiver whereby the gas tube will fire in response to a signal from the receiver when the plate circuit of the gas tube is rendered effective, a condenser, means for normally charging the condenser, the condenser being connected to discharge through the plate of the second tube whereby linear discharge of the condenser is obtained, the discharge of the condenser commencing when the gas tube fires and continuing until the second tube is rendered ineffective, and means whereby said indicating means is actuated in response to discharge of said condenser.

4. In a device for testing material, means for generating a pulse, means for transmitting the pulse into the material through an entering surface thereof and for receiving reflections, a receiver actuated by said transmitting and receiving means, indicating means including a gas discharge tube having a plate, a circuit for said plate including a second tube having a plate with linear plate current characteristic and having a control grid, means for placing a blocking voltage on the control grid for rendering the plate circuit of the gaseous discharge tube ineffective until the generation of the pulse ends and again placing a blocking voltage on the control grid prior to the reception of the reflected pulse from the opposite surface of the material, the grid of the gas tube being connected to the output of the receiver whereby the gas tube will fire in response to a signal from the receiver when the plate circuit of the gas tube is rendered effective, a condenser, means for normally charging the condenser, the condenser being connected to discharge through the plate of the second tube whereby linear discharge of the condenser is obtained, the discharge of the condenser commencing when the gas tube fires and continuing until the second tube is rendered ineffective, said indicating means including a mechanically movable member, and means whereby said member is actuated in response to the discharge of said condenser.

5. In a device for testing material, means for generating a pulse, means for transmitting the pulse into the material through an entering surface thereof and for receiving reflections, a receiver actuated by said transmitting and receiving means, indicating means adapted to be actuated by the output from said receiver, blocking means actuated by said pulse generating means, said blocking means including means for rendering said indicating means unresponsive to the output of said receiver until the generation of the pulse ends and a second means for rendering the indicating means again unresponsive to the output of said receiver prior to the reception of the reflected pulse from the opposite surface of the material, means actuated by the receipt of a reflection from a defect during the interval that the indicator is responsive for setting the indicating means into operation, and means for continuing said operation of said indicating means as long as said indicating means is responsive to the output of said receiver.

6. In a device for testing material, means for generating a pulse, means for transmitting the pulse into the material through an entering surface thereof and for receiving reflections, a receiver actuated by said transmitting and receiving means, indicating means actuated by the output from said receiver, blocking means actuated by said pulse generating means, said blocking means including means for rendering said indicating means unresponsive to the output of said receiver until the generation of the pulse ends and a second means for rendering the indicating means again unresponsive to the output of said receiver prior to the reception of the reflected pulse from the opposite surface of the material, said indicating means including a condenser, means for normally charging the condenser, means for discharging the condenser linearly, means actuated by the reflections received from a defect during the interval that the indicator is responsive for commencing discharging of the condenser, and means for continuing the discharge of the condenser until the indicating means is rendered ineffective.

7. In a device for testing material, means for generating a pulse, means for transmitting the pulse into the material through an entering surface thereof and for receiving reflections, a receiver actuated by said transmitting and receiving means, indicating means actuated by the output from said receiver, a two-part control for rendering said indicating means effective and ineffective, means for rendering one of said parts ineffective until the generation of the pulse ends, means for again rendering said part ineffective prior to the reception of the reflected pulse from the opposite surface of the material, means whereby rendering said first part effective and ineffective renders said second part effective and ineffective, and means for actuating said second part by the output from said receiver.

RALPH B. DE LANO, Jr.

REFERENCES CITED

The following references are of record in the file of this patent:

UNITED STATES PATENTS

| Number | Name | Date |
|---|---|---|
| 2,009,459 | Turner | July 30, 1935 |
| 2,012,837 | Tear | Aug. 27, 1935 |
| 2,346,093 | Tolson | Apr. 4, 1944 |
| 2,415,119 | Wellenstein | Feb. 4, 1947 |